United States Patent
Abdelaziz et al.

(10) Patent No.: US 12,476,878 B2
(45) Date of Patent: Nov. 18, 2025

(54) NETWORK IMPACT PREDICTION AND SIMULATION

(71) Applicant: RAKUTEN MOBILE, INC., Tokyo (JP)

(72) Inventors: Ahmed Abdelaziz, Tokyo (JP); Ziya Akhundov, Tokyo (JP); Ahmed Tasnim, Tokyo (JP); Arun Goyal, Tokyo (JP); Pradeep Kumar, Karnataka (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/917,650

(22) PCT Filed: Aug. 3, 2022

(86) PCT No.: PCT/US2022/039254
§ 371 (c)(1),
(2) Date: Oct. 7, 2022

(87) PCT Pub. No.: WO2024/030125
PCT Pub. Date: Feb. 8, 2024

(65) Prior Publication Data
US 2025/0071026 A1 Feb. 27, 2025

(51) Int. Cl.
*H04L 41/16* (2022.01)
*H04L 41/14* (2022.01)
*H04L 41/22* (2022.01)

(52) U.S. Cl.
CPC ............ *H04L 41/145* (2013.01); *H04L 41/16* (2013.01); *H04L 41/22* (2013.01)

(58) Field of Classification Search
CPC ........ H04L 41/145; H04L 41/16; H04L 41/22
(Continued)

(56) References Cited

U.S. PATENT DOCUMENTS 8,274,905 B2 * 9/2012 Edwards ............ H04L 43/0829
709/224
10,511,491 B2 * 12/2019 Kanojia ................ H04L 43/045
(Continued)

FOREIGN PATENT DOCUMENTS

WO WO-2005052739 A2 * 6/2005 ......... H04L 41/0853

OTHER PUBLICATIONS

International Search Report dated Oct. 28, 2022 from the International Searching Authority in International Application No. PCT/US2022/039254.
(Continued)

*Primary Examiner* — Karen C Tang
(74) *Attorney, Agent, or Firm* — Sughrue Mion, PLLC

(57) ABSTRACT

A system and method of simulating an effect on a network in response to a network-related event. The method can include receiving data with respect to a plurality of nodes within a network and generating a network graph with respect to each of the nodes within the network. In addition, the method can include calculating a first value based on network traffic with respect to each of the nodes based on the received data and calculating a second value based on performance with respect to each of the nodes based on the received data. Further, the method can include updating the network graph by applying the calculated first value and second value and identifying, from the updated network graph, one or more nodes from the plurality of nodes that are susceptible to an error or outage within the network.

16 Claims, 12 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 10,873,533 | B1* | 12/2020 | Ismailsheriff | ............ H04L 47/27 |
| 2016/0212031 | A1* | 7/2016 | Jain | ........................ H04L 41/142 |
| 2020/0175216 | A1* | 6/2020 | Ho | ............................ G06N 3/08 |
| 2021/0334445 | A1* | 10/2021 | Goldie | ................... G06F 30/392 |
| 2022/0124560 | A1* | 4/2022 | Yeh | ..................... H04L 41/5025 |
| 2022/0217630 | A1* | 7/2022 | Chen | ................. H04W 74/0816 |
| 2022/0254162 | A1* | 8/2022 | Felemban | ............... G06V 20/49 |

OTHER PUBLICATIONS

Written Opinion dated Oct. 28, 2022 from the International Searching Authority in International Application No. PCT/US2022/039254.

* cited by examiner

NETWORK IMPACT PREDICTION AND SIMULATION

CROSS REFERENCE TO RELATED APPLICATIONS

This application is a National Stage of International Application No. PCT/US2022/039254, filed Aug. 3, 2022.

BACKGROUND

Technical Field

The present disclosure described herein relates to a network impact prediction, simulation, and analysis system and method.

Background

Traffic load levels within a network impact the performance of all network elements. To maintain a reasonable system cost, networks are typically over-subscribed for their potential peak traffic rates. In other words, the available resources of the network could not support all possible network requests from users that could potentially occur at the same time. When a failure of a network element or other error occurs, such as during a scheduled network maintenance event, a communication path in a meshed network becomes unavailable and the traffic that was being handled by a certain number of transport paths or nodes must then be handled by other paths or nodes. In an IP network, the error correction action (i.e., re-convergence) automatically re-routes traffic paths over the remaining links after some amount of convergence time.

Conventional activity planning is mostly a manual approach that is generally based on prior human knowledge and history related to the network, which can be very risky and impact user experience with no proper visibility of pre-activity assessment of a network's health and status. In general, network operators are trying to avoid any network impact, error, or disturbance due to the scheduled-tasks, maintenance, repairs, and other network related issues, which is mainly based on prior learned lessons learned, manual human monitoring, and prior actions in response to a network disturbance. Such conventional methods do not provide the network operator with end-to-end visibility of the various links and nodes of the entire network topology or meshed network.

Hence, what is needed is an automated method and system of predicting and simulating a network response with respect to the various nodes and components of an operator's network in response to a potential network scheduled event, maintenance, error, or other network disturbance.

SUMMARY

According to example embodiments, a network impact prediction and simulation system and method is disclosed for monitoring an overall condition of an IP network based on various factors, including but not limited to, data-traffic congestion, bandwidth capacity, processor occupancy, packet loss, transmission delay, and other key performance indicators (KPIs) at each inter-connected node (e.g., routing/switching equipment) of the network. Further, the network impact prediction and simulation system and method can automatically investigate and calculate the probability of a node-outage occurrence and analyze its subsequent impact on the overall network and the subscribers connected to it. Based on this analysis, prediction, and other external requests, the method and system of the disclosure described herein can prioritize the maintenance/upgrade (or scheduled network event) for multiple network equipment and components sequentially (or in any other configuration) while reducing network outage impact to a minimum, among other advantages.

According to other example embodiments, additional advantages of the network impact prediction and simulation system and method can include calculating, simulating, assessing a probability of router-outage prior to an actual incident, providing router status analysis based on both data-traffic congestion and KPIs, analyzing the impact of multiple router-outage on the entire IP network of one or more network providers, investigating, predicting, and simulating the impact of outage on the subscribers in terms of transmission-delay and data-rate drop, simulating and providing a graphical user interface (GUI) visualization of the network topology with real-time monitoring capabilities, and reducing router-outage impact by suggesting task-priority sequence of various network nodes or components for maintenance/upgrade, among others. Further, in other example embodiments, the method and system of the disclosure described herein can provide automated fetching network topology from an Element Management System (EMS), from different domains (e.g., RAN, EPC, IPTX), and further provide a GUI visualization and graph of the network topology for assessment. The method and system of the disclosure described herein can also provide an automated audit of the network and judgement/predictions for a network based on user experience, network performance based on input data, and based on machine learning or a trained neural network with respect to historical data.

According to other example embodiments, the network impact prediction and simulation system and method of the disclosure described herein can discover and avoid any foreseen or unforeseen IP network errors or disturbances before running planned activities or planned network events. Here, such planned activities or network events set to work can include software/hardware upgrade, troubleshooting, capacity expansions, maintenance, repair, or various disturbances within the network (such as within the transport layer network). In example embodiments, machine learning and computational neural network training algorithms of the disclosure described herein can dynamically highlight alternative network paths and provide a clear overall network status, report, and recommendations based on available network redundancy, redundancy risk, traffic load, and path test, among others. Further, the process can have certain computing devices or network elements, nodes, routers, and components be aware of paths that are currently or concurrently scheduled for a change request (CR) within a same window time frame and makes assessments based on First Come First Serve Stacked CR (e.g., to accept or deny/deem too risk the event given approved scheduled rate). In addition, the process can provide any visibility or visualization format to a user for CRs that cannot be approved together. Further, the process can allow testing or simulating a network path before execution, testing alternative paths, and providing a simulation as if one or more nodes are down and test all alternative paths to an end point. Further, the process can show capacity support for a path A and path B after a switchover. In addition, the process can show a range of impact in a scenarios where all equipment or components of the network that may be involved in a planned activity or event (e.g., Routers, Agg switches, Ran Sites List) and send a warning when a path doesn't conform with existing LLD and network topology. Further, the process can provide a map and a network ring topology based visualization to a user or network operator.

According to other example embodiments, a method of simulating an effect on a network in response to a network-related event is disclosed, the method including: receiving data with respect to a plurality of nodes within a network; generating a network graph with respect to each of the nodes within the network; calculating a first value based on network traffic with respect to each of the nodes based on the received data; calculating a second value based on performance with respect to each of the nodes based on the received data; updating the network graph by applying the calculated first value and second value; and identifying, from the updated network graph, one or more nodes from the plurality of nodes that are susceptible to an error or outage within the network.

The method may further include sending the updated network graph to a neural network.

In addition, the method may include training the neural network based on the updated network graph and one or more associations between the calculated first value and second value for each of the nodes.

Further, the method may include disabling at least one first node from the plurality of nodes within the network.

Also, the method may include routing network traffic away from the disabled at least one first node to an at least one second node from the plurality of nodes within the network. Further, the method may include determining if the second value is below a threshold value with respect one or more nodes from the plurality of nodes within the network.

In addition, the method may include upon determining if the second value is below a threshold value with respect to one or more nodes from the plurality of nodes within the network, disabling, based on priority, one or more nodes from the plurality of nodes within the network based on the disabled first node's impact on the network, wherein the impact is based on at least one of network or node traffic congestion, network or node throughput, network or node bandwidth, network or node packet loss, network or node performance, or network or node downtime.

Further, the method may include upon determining if the second value is not below a threshold value with respect to one or more nodes from the plurality of nodes within the network, disabling, simultaneously, one or more nodes from the plurality of nodes within the network based on the disabled first node's impact on the network, wherein the impact is based on at least one of network or node traffic congestion, network or node throughput, network or node bandwidth, network or node packet loss, network or node performance, or network or node downtime.

In addition, the step of generating the network graph with respect to each of the nodes within the network may further include outputting the network graph as a network ring topology visualization within a graphical user interface, wherein each of the nodes are shown in relation to each other.

Also, the method may include receiving a selection with respect to one or more displayed nodes; and outputting one or more properties associated with the selected one or more nodes.

Further, a link between each of the nodes within the graphical user interface may be represented by one or more lines comprised of varying thickness depending on the level network traffic associated with the link or the level of network traffic between two nodes.

In other example embodiments, an apparatus for simulating an effect on a network in response to a network-related event is disclosed, including a memory storage storing computer-executable instructions; and a processor communicatively coupled to the memory storage, wherein the processor is configured to execute the computer-executable instructions and cause the apparatus to: receive data with respect to a plurality of nodes within a network; generate a network graph with respect to each of the nodes within the network; calculate a first value based on network traffic with respect to each of the nodes based on the received data; calculate a second value based on performance with respect to each of the nodes based on the received data; update the network graph by applying the calculated first value and second value; and identify, from the updated network graph, one or more nodes from the plurality of nodes that are susceptible to an error or outage within the network.

In addition, the computer-executable instructions, when executed by the processor, may further cause the apparatus to send the updated network graph to a neural network.

Further, the computer-executable instructions, when executed by the processor, may further cause the apparatus to train the neural network based on the updated network graph and one or more associations between the calculated first value and second value for each of the nodes.

Also, the computer-executable instructions, when executed by the processor, may further cause the apparatus to disable at least one first node from the plurality of nodes within the network.

In addition, the computer-executable instructions, when executed by the processor, may further cause the apparatus to route network traffic away from the disabled at least one first node to an at least one second node from the plurality of nodes within the network.

Further, the computer-executable instructions, when executed by the processor, may further cause the apparatus to determine if the second value is below a threshold value with respect one or more nodes from the plurality of nodes within the network.

In addition, the computer-executable instructions, when executed by the processor, further cause the apparatus to upon determining if the second value is below a threshold value with respect to one or more nodes from the plurality of nodes within the network, disable of one or more nodes, based on priority, from the plurality of nodes within the network based on the disabled first node's impact on the network, wherein the impact is based on at least one of network or node traffic congestion, network or node throughput, network or node bandwidth, network or node packet loss, network or node performance, or network or node downtime.

Also, the computer-executable instructions, when executed by the processor, may further cause the apparatus to upon determining if the second value is not below a threshold value with respect to one or more nodes from the plurality of nodes within the network, disable, simultaneously, one or more nodes from the plurality of nodes within the network based on the disabled first node's impact on the network, wherein the impact is based on at least one of network or node traffic congestion, network or node throughput, network or node bandwidth, network or node packet loss, network or node performance, or network or node downtime In addition, the computer-executable instructions, when executed by the processor, further cause the apparatus to output the network graph as a network ring topology visualization within a graphical user interface, wherein each of the nodes are shown in relation to each other; receive a selection with respect to one or more displayed nodes; and output one or more properties associated with the selected one or more nodes within the graphical user interface.

In other example embodiments, a non-transitory computer-readable medium comprising computer-executable instructions for simulating an effect on a network in response to a network-related event by an apparatus, wherein the computer-executable instructions, when executed by at least one processor of the apparatus, cause the apparatus to receive data with respect to a plurality of nodes within a network; generate a network graph with respect to each of the nodes within the network; calculate a first value based on network traffic with respect to each of the nodes based on the received data; calculate a second value based on performance with respect to each of the nodes based on the received data; update the network graph by applying the calculated first value and second value; and identify, from the updated network graph, one or more nodes from the plurality of nodes that are susceptible to an error or outage within the network.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
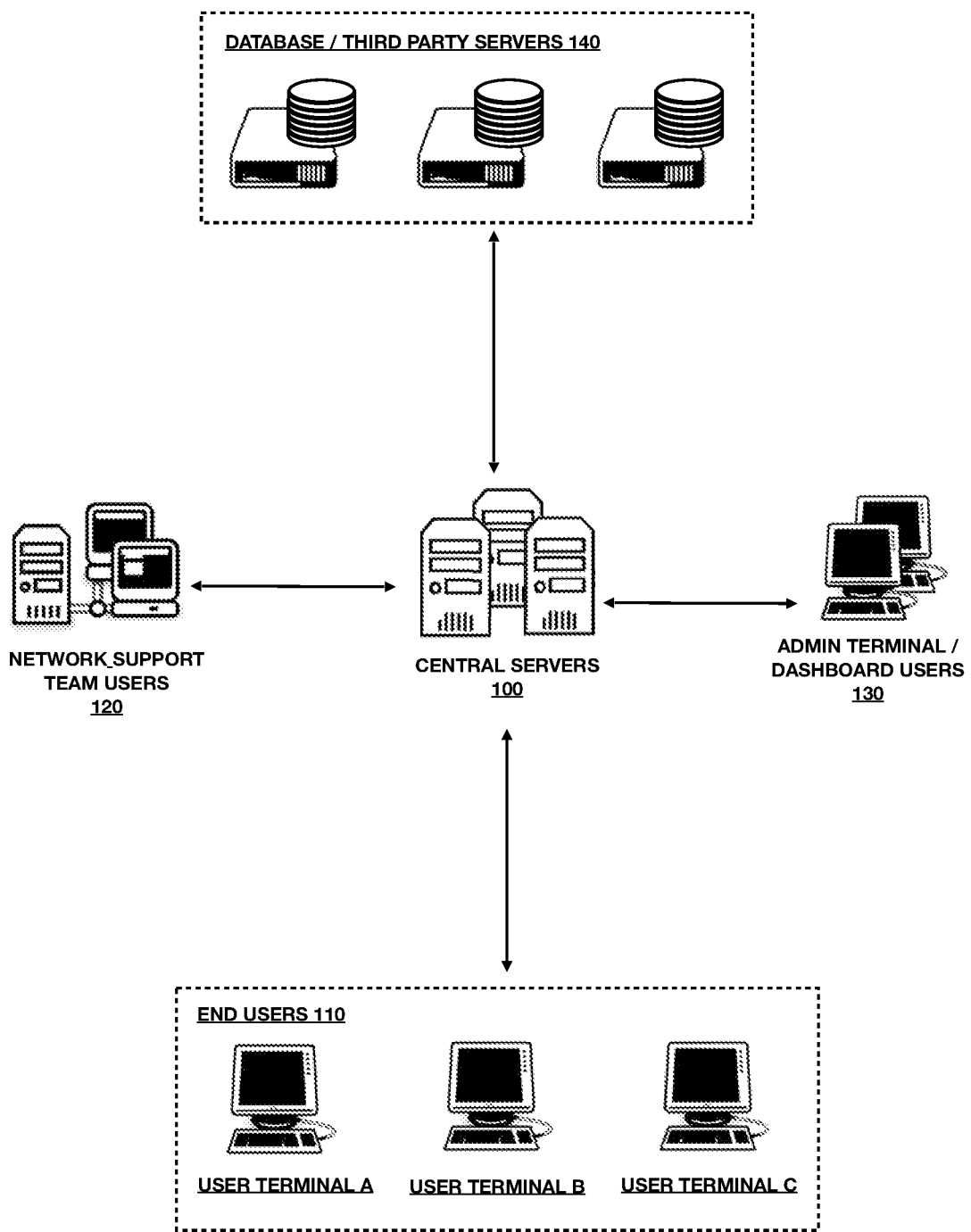
FIG. 1 illustrates a diagram of a general system architecture of the network impact prediction and simulation method and system of the disclosure described herein according to one or more embodiments.

The following detailed description of example embodiments refers to the accompanying drawings. The same reference numbers in different drawings may identify the same or similar elements.

The foregoing disclosure provides illustrations and descriptions, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., any "smart phone"), a personal computer, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including short-range ultra-high frequency (UHF) device, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, components, features, options, and/or attributes of the disclosure described herein. For example, the portal can be a web page accessed with a web browser, mobile device application, or any application or software residing on a computing device.

FIG. 1 illustrates a diagram of a general network architecture according to one or more embodiments. Referring to FIG. 1, end users 110, network support team users 120, and admin terminal/dashboard users 130 (collectively referred to herein as users 110, 120, and 130) can be in bi-directional communication over a secure network with central servers or application servers 100 according to one or more embodiments. In addition, users 110, 120, 130 may also be in direct bi-directional communication with each other via the network system of the disclosure described herein according to one or more embodiments. Here, users 110 can be any type of customer, network service provider agent, or vendor, among others, of a network or telecommunication service provider, such as users operating computing devices and user terminals A, B, and C. Each of users 110 can communicate with servers 100 via their respective terminals or portals, wherein servers 110 can provide or automatically operate the network impact prediction engine system and method of the disclosure described herein. Users 120 can include application development members or support agents of the network service provider for developing, integrating, and monitoring the network impact prediction and simulation method and system of the disclosure described herein, including assisting, scheduling/modifying network events, and providing support services to end users 110. Admin terminal/dashboard users 130 may be any type of user with access privileges for accessing a dashboard or management portal of the disclosure described herein, wherein the dashboard portal can provide various user tools, GUI visualization, maps, graphs, and customer support options. It is contemplated within the scope of the present disclosure described herein that any of users 110 and 120 may also access the admin terminal/dashboard 130 of the disclosure described herein.

Still referring to FIG. 1, central servers 100 of the disclosure described herein according to one or more embodiments can be in further bi-directional communication with database/third party servers 140, which may also include users. Here, servers 140 can include vendors and databases where various captured, collected, or aggregated data, such as current, real-time, and past network related historical and KPI data, may be stored thereon and retrieved therefrom for network analysis, predictions, and simulations by servers 100. However, it is contemplated within the scope of the present disclosure described herein that the network impact prediction and simulation method and system of the disclosure described herein can include any type of general network architecture.

Still referring to FIG. 1, one or more of servers or terminals of elements 100-140 may include a personal computer (PC), a printed circuit board comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers, terminals, and users 100-140 may include a set of components, such as a processor, a memory, a storage component, an input component, an output component, a communication interface, and a JSON UI rendering component. The set of components of the device may be communicatively coupled via a bus.

The bus may comprise one or more components that permit communication among the set of components of one or more of servers or terminals of elements 100-140. For example, the bus may be a communication bus, a cross-over bar, a network, or the like. The bus may be implemented using single or multiple (two or more) connections between the set of components of one or more of servers or terminals of elements 100-140. The disclosure is not limited in this regard.

One or more of servers or terminals of elements 100-140 may comprise one or more processors. The one or more processors may be implemented in hardware, firmware, and/or a combination of hardware and software. For example, the one or more processors may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operation of one or more of servers or terminals of elements 100-140 and/or of the set of components of one or more of servers or terminals of elements 100-140 (e.g., memory, storage component, input component, output component, communication interface, rendering component).

One or more of servers or terminals of elements 100-140 may further comprise memory. In some embodiments, the memory may comprise a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers or terminals of elements 100-140 may store information and/or computer-readable instructions and/or code related to the operation and use of one or more of servers or terminals of elements 100-140. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers or terminals of elements 100-140 may further comprise an input component. The input component may include one or more components that permit one or more of servers and terminals 100-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component any one or more of servers or terminals of elements 100-140 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers or terminals of elements 100-140 may further comprise a communication interface. The communication interface may include a receiver component, a transmitter component, and/or a transceiver component. The communication interface may enable one or more of servers or terminals of elements 100-140 to establish connections and/or transfer communications with other devices (e.g., a server, another device). The communications may be enabled via a wired connection, a wireless connection, or a combination of wired and wireless connections. The communication interface may permit one or more of servers or terminals of elements 100-140 to receive information from another device and/or provide information to another device. In some embodiments, the communication interface may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide for communications with another device via a device-to-device (D2D) communication link, such as Flash-LinQ, WiMedia, Bluetooth, ZigBee, Wi-Fi, LTE, 5G, and the like. In other embodiments, the communication interface may include an Ethernet interface, an optical interface, a coaxial interface, an infrared interface, a radio frequency (RF) interface, or the like.

Figure 2:
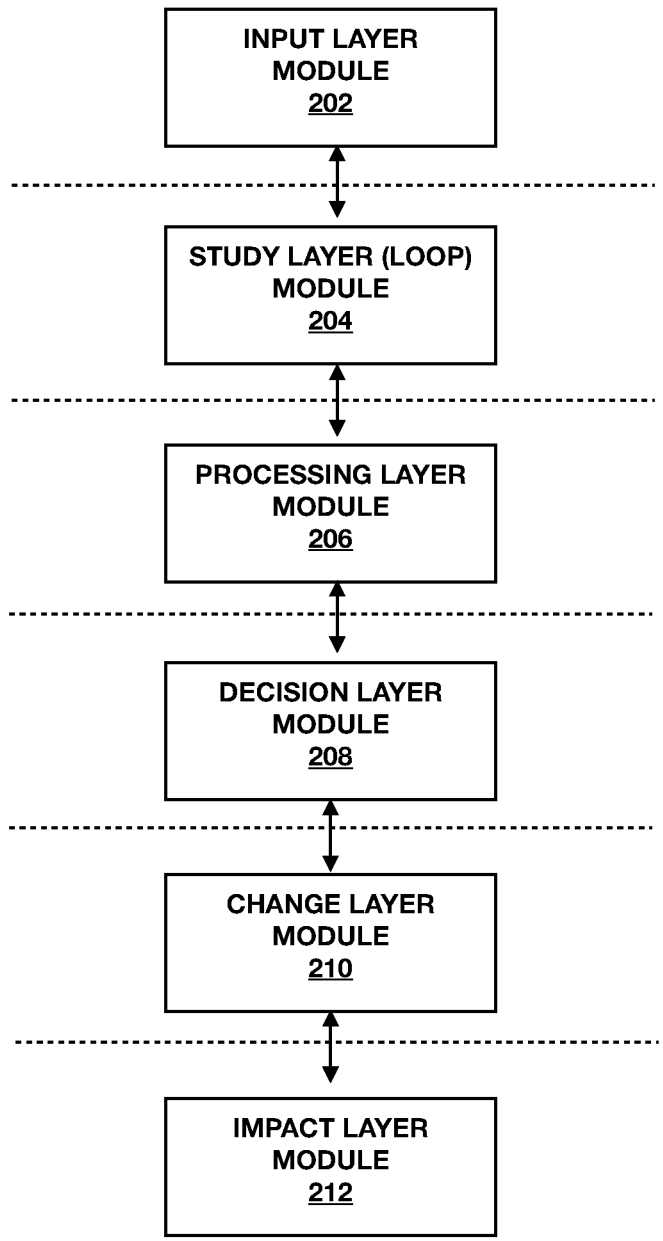
FIG. 2 illustrates a diagram of components and modules of the network impact prediction and simulation method and system of the disclosure described herein according to one or more embodiments.

FIG. 2 illustrates various modules and components architecture of the network impact prediction and simulation method and system of the disclosure described herein. Here, within a IP network (such as a transport layer network), the network impact prediction and simulation engine or framework 200 of the disclosure described herein can include an input layer module 202 in bi-directional communication with a study layer (loop) module 204 in bi-directional communication with a processing layer module 206 in bi-directional communication with a decision layer module 208 in bi-directional communication with a change layer module 210 in further bi-directional communication with an impact layer module 212.

Figure 3A:
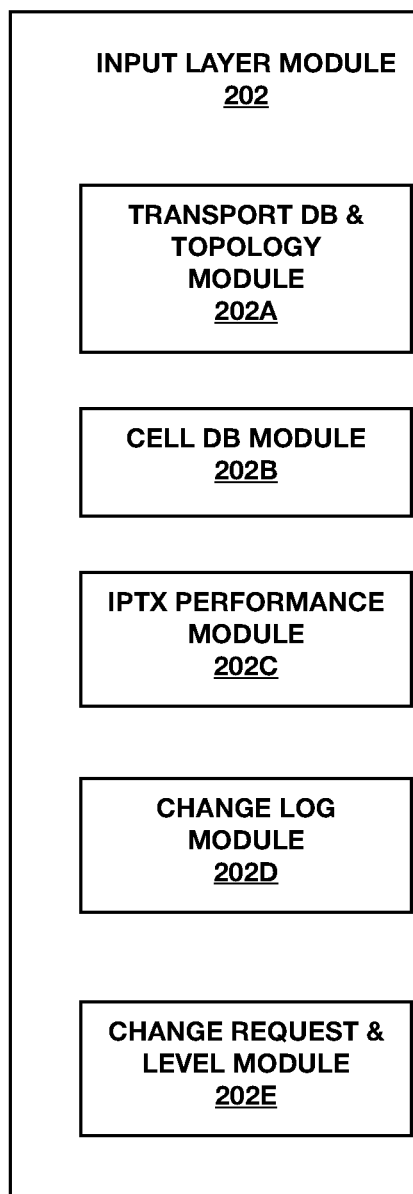
FIG. 3A illustrates another diagram of components and modules of the network impact prediction and simulation method and system of the disclosure described herein according to one or more embodiments.

Referring to FIG. 3A, in general, input layer module 202 can perform the operations of receiving and processing raw network data, network topology information, network and node or link KPIs, and change logs, among others. In particular, input layer module 202 can further include various sub-modules, such as network transport layer database (DB) and topology module 202A, network cell DB module 202B, IPTX performance module 202C, change long module 202D, and change request and level module 202E. Here, any of modules 202A-202E may operate independently or in combination with each other to support operation of the input layer module 202.

Figure 3B:
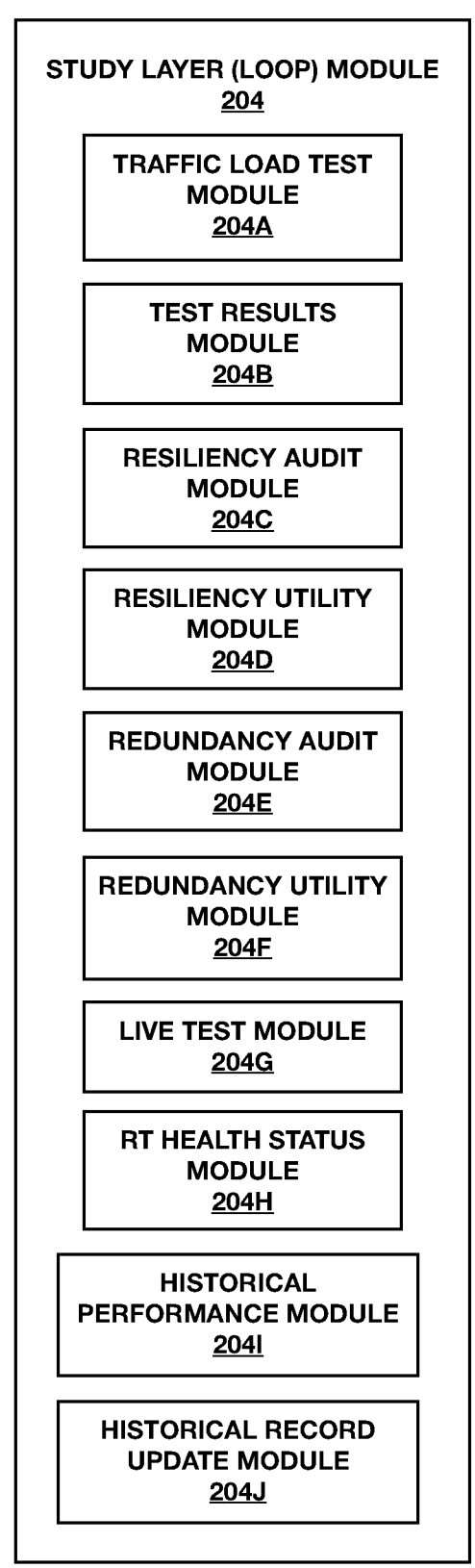
FIG. 3B illustrates another diagram of components and modules of the network impact prediction and simulation method and system of the disclosure described herein according to one or more embodiments.

Referring to FIG. 3B, after the input layer module 202, the study layer (loop) module 204, in general, can provide various testing and audits of the network, including its links and nodes, based on the received input from the input layer module 202, in order to study potential network effects, network status, and/or network health of its various components (such as routers/switches) prior to implementation of the processing layer module 206. Further, such testing and auditing of the network can be performed or executed in a looped manner or operation. Here, the study layer module 204 can include various sub-modules, such as traffic load test module 2024A for analyzing and testing network traffic, test results module 204B for outputting the traffic load test results, resiliency audit module 204C for auditing the network's resilience to a planned event or outage, resiliency utility module 204D for outputting/monitoring/modifying various parameters of the resiliency audit, redundancy audit module 204E for auditing the network's redundancy to a planned event or outage, redundancy utility module 204F for outputting/monitoring/modifying various parameters of the redundancy audit, live test module 204G for real-time testing of a network's links, nodes, and components, RT health status module 204H for providing the current health of a network (or the health of the network after a planned event or outage), historical performance module 204I for analyzing historical network performance and KPIs with respect to the network links, nodes, and components, and a historical record update module 204J for updating network historical data for updating prior network performance data, such as in response to the various testing, audit, prediction, and simulation of the network. Here, any of modules 204A-204J may operate independently or in combination with each other to support operation of the study layer (loop) module 204.

Figure 4A:
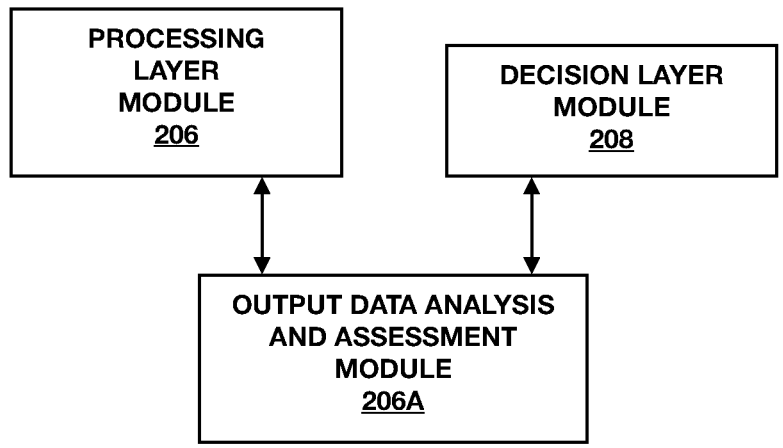
FIG. 4A illustrates another diagram of components and modules of the network impact prediction and simulation method and system of the disclosure described herein according to one or more embodiments.

Referring to FIG. 4A, after the study layer (loop) module 204, the processing layer module 206 and subsequent decision layer module 208 can each receive the output of the study layer (loop) module 204 in order to further analyze and assess the received network testing and audit data, such as via a neural network or machine learning algorithm. In particular, both processing layer module 206 and decision layer module 208 can include access to the output data analysis and assessment module 206A for such analysis of the network links, nodes, components, and KPIs, among others.

Figure 4B:
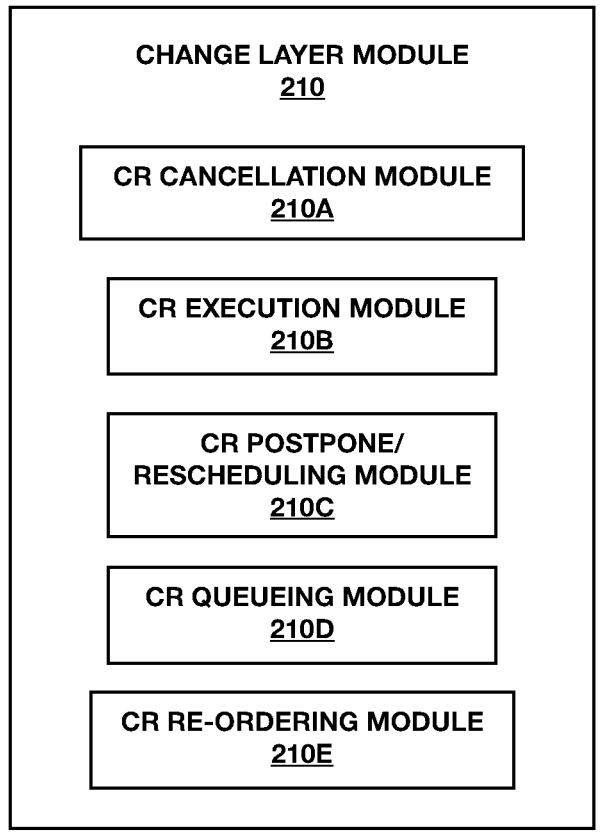
FIG. 4B illustrates another diagram of components and modules of the network impact prediction and simulation method and system of the disclosure described herein according to one or more embodiments.

Referring to FIG. 4B, the change layer module 210 can receive the output of the processing layers module 206 and decision layer module 208. In general, change layer module 210 can direct and manage one or more schedules tasks, operations, maintenance, or network outage related events by either executing, cancelling, postponing, re-ordering, or re-scheduling such events. In particular, the change layer module 210 can include various sub-modules, such as change request (CR) cancellation module 210A for cancelling one or more network related events, CR execution module 212B for executing one or more planned network events, CR postpone/rescheduling module 212C for rescheduling one or more planned network events, CR queueing module 212D for placing one or more scheduled events in a queue for execution, and CR re-ordering module 212E for re-ordering or re-initiating one or more networks events. Here, any of modules 210A-210E may operate independently or in combination with each other to support change layer module 210.

Figure 5:
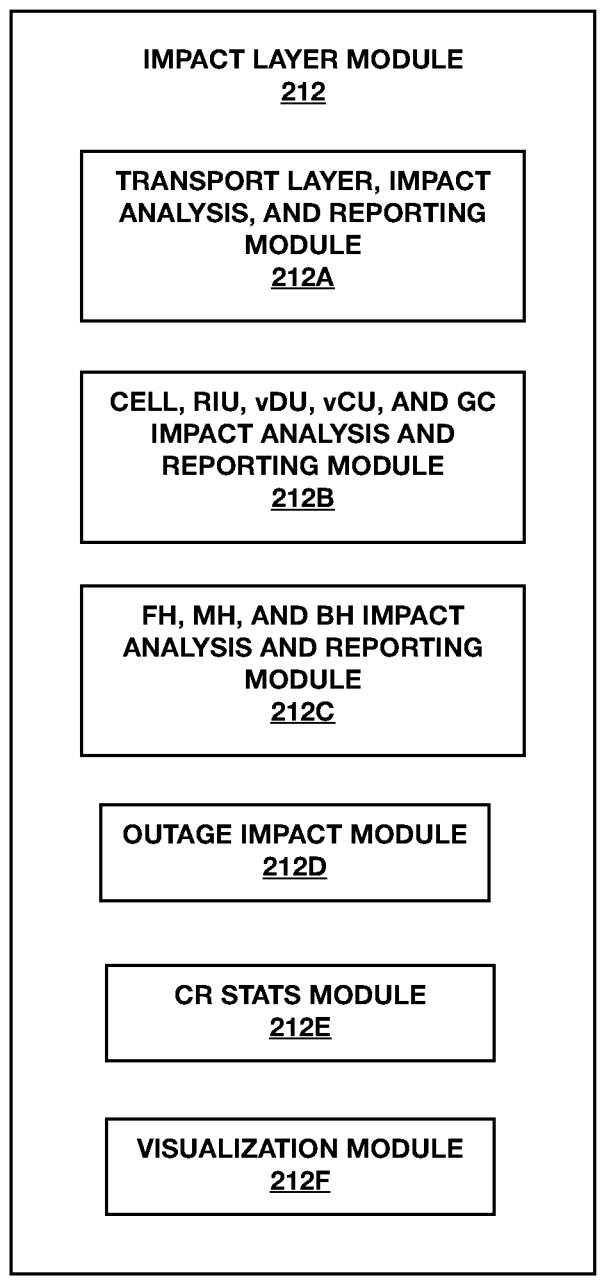
FIG. 5 illustrates another diagram of components and modules of the network impact prediction and simulation method and system of the disclosure described herein according to one or more embodiments.

Referring to FIG. 5, the impact layer module 212 can receive the output of the change layer module 210. In general, the impact layer module can provide a prediction, analysis, assessment, and simulation of the overall effects or side effects of a planned or scheduled network event, such as maintenance, repair, upgrades, etc., including providing reporting, statistics of the network and visualizations of the network topology. In particular, impact layer module 212 can include various sub-modules, such as transport layer, impact analysis, and reporting module 212A for reporting the impact of a potential or planned network event on an entire IP network of one or more network operators. In addition, module 212 may also include cell, RIU, vDU, vCU, and GC impact analysis and reporting module 212B for further reporting the impact on such systems and units.

Figure 6:
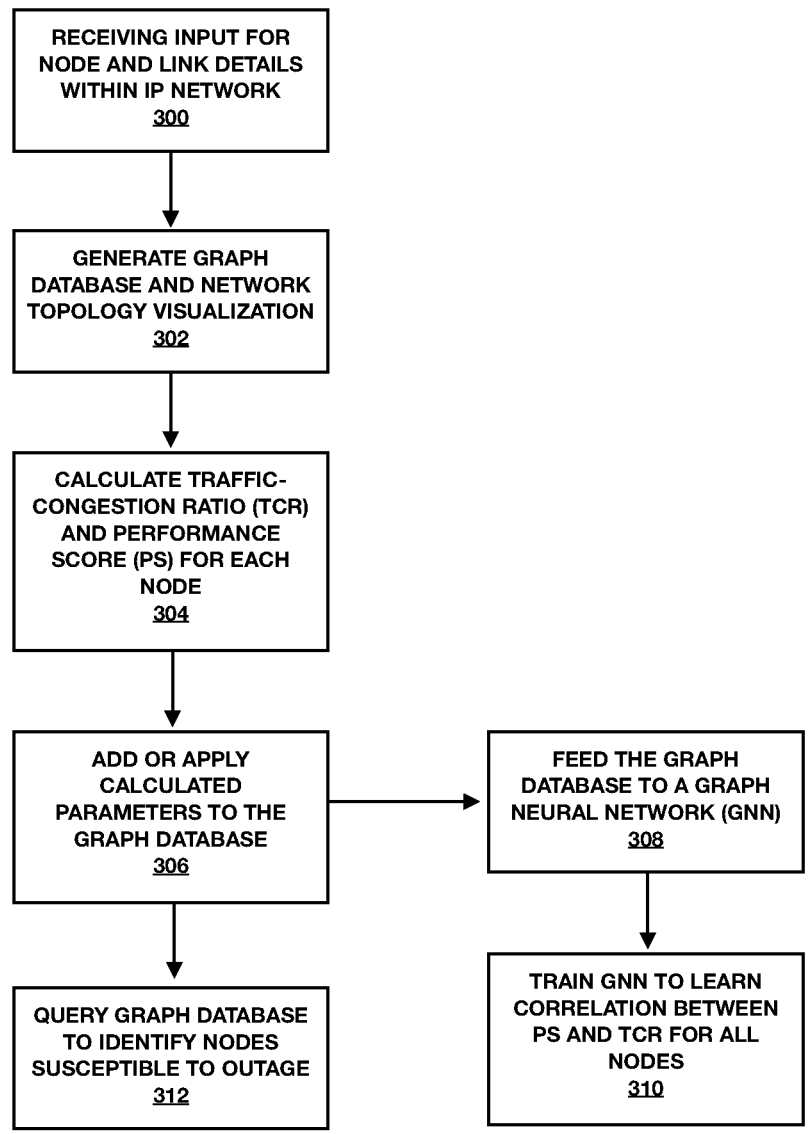
FIG. 6 illustrates a process flow diagram for a method of operation of the network impact prediction and simulation method and system of the disclosure described herein according to one or more embodiments.

FIG. 6 illustrates one exemplary embodiment for a method of operation of the network impact prediction and simulation method and system of the disclosure described herein. In particular, the method and system of the disclosure described herein can show real-time monitoring of node status throughout the network and further identifies the nodes that are the most prone or susceptible to maintenance or outage-occurrence. Here, by using historical graph data, a graph neural network (GNN) can be trained to correlate node-performance score with Traffic Congestion Ratio (TCR), among other methods. Referring to FIG. 6, the process can begin at step 300, where the network impact prediction and simulation framework and method and system of the disclosure described herein receives one or more inputs for one or more node and link details within an IP network. In particular, the foregoing node details can include various parameters and properties, such as node credentials (e.g., device information/details), maximum bandwidth of the node, throughput (cell site and transport traffic) of the node, health index/status of the node, packet loss per second data of the node, and transmission delay of the node, among others. Further, the foregoing link details can include various parameters and properties, such as the connection type of the link, the link type, and the name of the link protocol, among others.

Figure 8A:
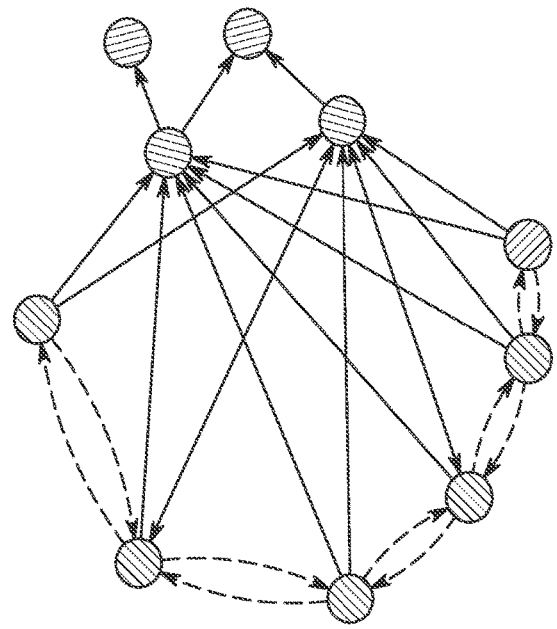
FIGS. 8A-10B illustrate graphical user interface portals of various maps and graphs for a network topology of the network impact prediction and simulation method and system of the disclosure described herein according to one or more embodiments.

Still referring to FIG. 6, after receiving the foregoing at step 300, the process can proceed to step 302. At step 302, the process can generate a graph network model database and a network topology visualization for display within a GUI (which can be user configurable), wherein the visualization can display the nodes and their links within the network, such as shown in FIG. 8A for exemplary purposes. In particular, the graph network model database is generated from the information received at step 300. The graph network model databases can include structured data (e.g., tables with rows and columns) and unstructured data (e.g., graphs). For exemplary purposes, an IP network topology can be a graph, where nodes (routers) are connected via links (IP network). Further, each node and link of the graph have their own set of attributes and in combination form the graph network model database (wherein the database is formed at step 306). Once the visualization of the network is provided, the process can then proceed to step 304. At step 304, the process can calculate a traffic congestion ratio (TCR) and a performance score (PS) for each node within the network. Here, TCR and PS can be represented by the following: TCR=bandwidth−(throughput*100%) and PS=((health index*constant)/(packet loss+transmission delay))*100%. After the TCR and PS have been determined/calculated, the process can then proceed to step 306. At step 306, the process can add or apply the calculated TCR and PS parameters from step 304 to the graph network or graph database of step 302. Next, at step 308, the process can then feed or transmit the graph network model database of step 302, including its input/output parameters, to a graph neural network (GNN) or a machine learning algorithm for analysis and training of the GNN. Next, at step 310, with the received information from the graph database, the process can train the GNN to learn one or more correlations and/or associations between the PS and TCR for one or more (or all) nodes or links of the network, which can be used for predicting or identifying nodes susceptible to an outage and/or simulating the effect of a planned activity or network event on one or more nodes of the network, among others. In particular, to keep the GNN updated, it can be retrained at certain time intervals, such as once per month, with the latest data. Hence, steps 308 and 310 can be executed periodically using historical record data (e.g., for a month) that is received at step 306. Referring back to step 306, the process can also proceed to step 312. At step 312, the process can query the graph database to identify one or more nodes that may be susceptible to outage after a simulated planned network activity or event such as from historical data, including using knowledge from the GNN. In particular, the query process at step 312 can sequence the nodes, wherein nodes having high TCR and a low PS are prioritized and sequenced in order relative to other nodes.

Figure 7:
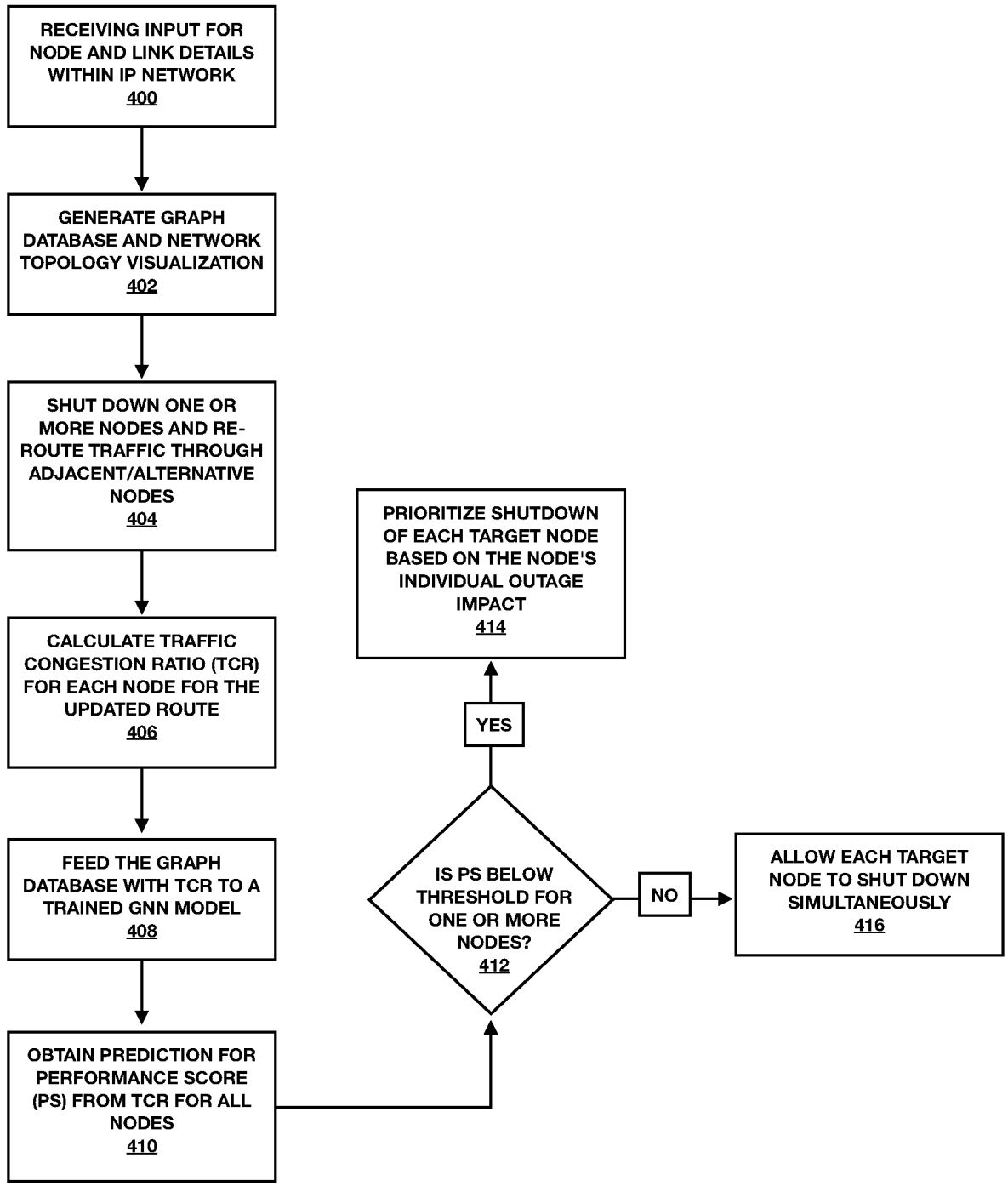
FIG. 7 illustrates another process flow diagram for a method of operation of the network impact prediction and simulation method and system of the disclosure described herein according to one or more embodiments.

FIG. 7 illustrates another exemplary embodiment for a method of operation of the network impact prediction and simulation system and method of the disclosure described herein. In particular, the method and system can monitor and prioritize a network event or activity (such as maintenance/upgrade) for multiple network equipment and components sequentially while reducing the outage impact of the overall network to a minimum. Here, after creating and generating a graph database, one or more nodes can be switched off in the simulation of the disclosure described herein. The foregoing action can automatically re-route the traffic through the adjacent/alternative nodes in the network. A trained GNN model can then predict a performance score (PS) from the traffic congestion ration (TCR).

Still referring to FIG. 7, the process can begin at step 400 where the network impact prediction and simulation framework system and method of the disclosure described herein can receive input for one or more node and link details within an IP network. In particular, the foregoing node details can include various parameters and properties, such as node credentials (e.g., device information/details), maximum bandwidth of the node, throughput (cell site and transport traffic) of the node, health index/status of the node, packet loss per second data of the node, and transmission delay of the node, among others. Further, the foregoing link details can include various parameters and properties, such as the connection type of the link, the link type, and the name of the link protocol, among others.

Still referring to FIG. 7, after receiving the inputs at step 400, the process can proceed to step 402. At step 402, the process can generate a graph network model database and network topology visualization via a GUI. Next, at step 404, the process can begin to close or shut down one or more target nodes within the network and re-route the network traffic from the shut down node(s) to one or more adjacent/alternative nodes (such as nodes with less traffic or nodes meeting certain criteria, KPIs, or thresholds). Next, at step 406, the process can calculate a traffic congestion ration (TCR) for the updates network traffic routes to the one alternative one or more nodes. Next, at step 408, the process can feed or transmit the graph database having the TCR to a trained GNN model for analysis and further training of the GNN. Next, at step 410, the process can obtain a prediction for a performance score (PS) for one or more (or all) nodes within the network. Next, at step 412, the process can determine whether the PS is below a threshold value for one or more nodes, and if yes, then the process can proceed to step 414, and if no, then the process can proceed to step 416. At step 414, the process can prioritize the shut-down of the one or more target nodes (the identified nodes from step 404 for planned shut-down) based on each node's individual outage impact on the network, and further execute such shut-down of those nodes within the simulation. Here, such priority may be based on factors such as determining the one or more nodes where the PS deterioration is the most severe, determining the number of users connected to those deteriorated one or more nodes, and determining the amount of data rate/transmission speed that will drop due to the bandwidth limitation with respect to those one or more nodes, among others. At step 416, the process can allow one or more target nodes to shut down simultaneously, and further execute such shut down within the simulation.

TABLES 1-2 and FIGS. 8A-10B illustrates one or more exemplary embodiments of testing and simulating an impact on a network in response to a planned network event or activity. In particular, the first column within TABLE 1 can represent the nodes or links within a network in one exemplary embodiment, such as group center or global center nodes (GC) connected to aggregation points (AG), GC's connected to other GC's, and AG's connected to other AG's within a transport network. In addition, TABLES 1-2 can also include each node's properties and calculated parameters, such as connected users, connected cell sites, cell site traffic, throughput, traffic congestion ratio (TCR), packet loss, health index, transmission delay, and performance score (PS).

TABLE 1

| GC/AG) Nodes | Connected Users | Connected Cell Sites | Bandwidth (Mbps) | Cell Site Traffic (Mbps) | Transport Traffic (Mbps) | Throughput | Traffic Congestion Ratio (%) | Packet Loss/sec | Health Index | Transmission Delay | Performance Score (%) |
|---|---|---|---|---|---|---|---|---|---|---|---|
| Node A | 20 | 4 | 40 | 13.5 | 8.3 | 21.8 | 49.2 | 0.45 | 4.1 | 20 ms | 70 |
| Node B | 15 | 4 | 40 | 13.5 | 8.3 | 21.8 | 49.2 | 0.45 | 4.1 | 20 ms | 70 |
| Node C | 30 | 4 | 40 | 13.5 | 8.3 | 21.8 | 49.2 | 0.45 | 4.1 | 20 ms | 70 |
| Node D | 65 | 12 | 100 | | 64.5 | 64.5 | 64.5 | 1.35 | 3.9 | 25 ms | 68 |

FIGS. 8A-10B each illustrate a GUI dashboard and portal for displaying a visualization of one or more networks, including each node and link within the network, including their connections. Referring to FIGS. 8A-8B, an exemplary topology graph shows how various nodes (or routers) of an IP network that are connected to each other, including their properties. Here, detailed information pertaining to each node (such as router information), can be obtained by selecting the particular node from the visual display, wherein such information can be shown in real time, such as shown in FIG. 8A. Further, with respect to one exemplary simulation as applied to FIGS. 8A-8B, the method and system of the disclosure described herein can check the throughput and performance metrics (packet-loss, health-index, transmission-delay, etc.) of each node and calculate the TCR and PS for each node within the network. Thus, the network topology of FIG. 8A can show how all the nodes are performing at one glance in a visual and easy to understand presentation.

Figure 8B:
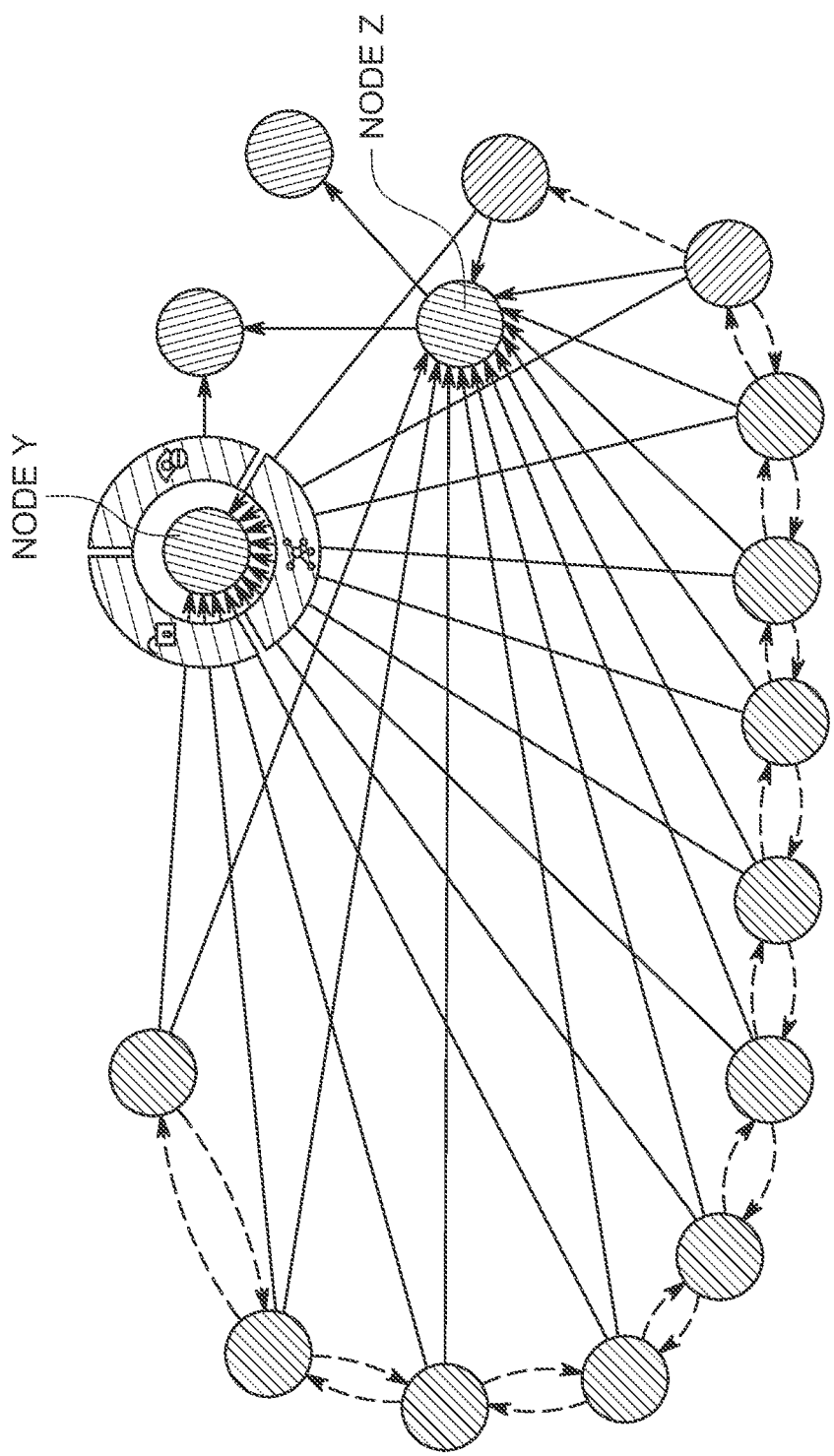
Figure 9A:
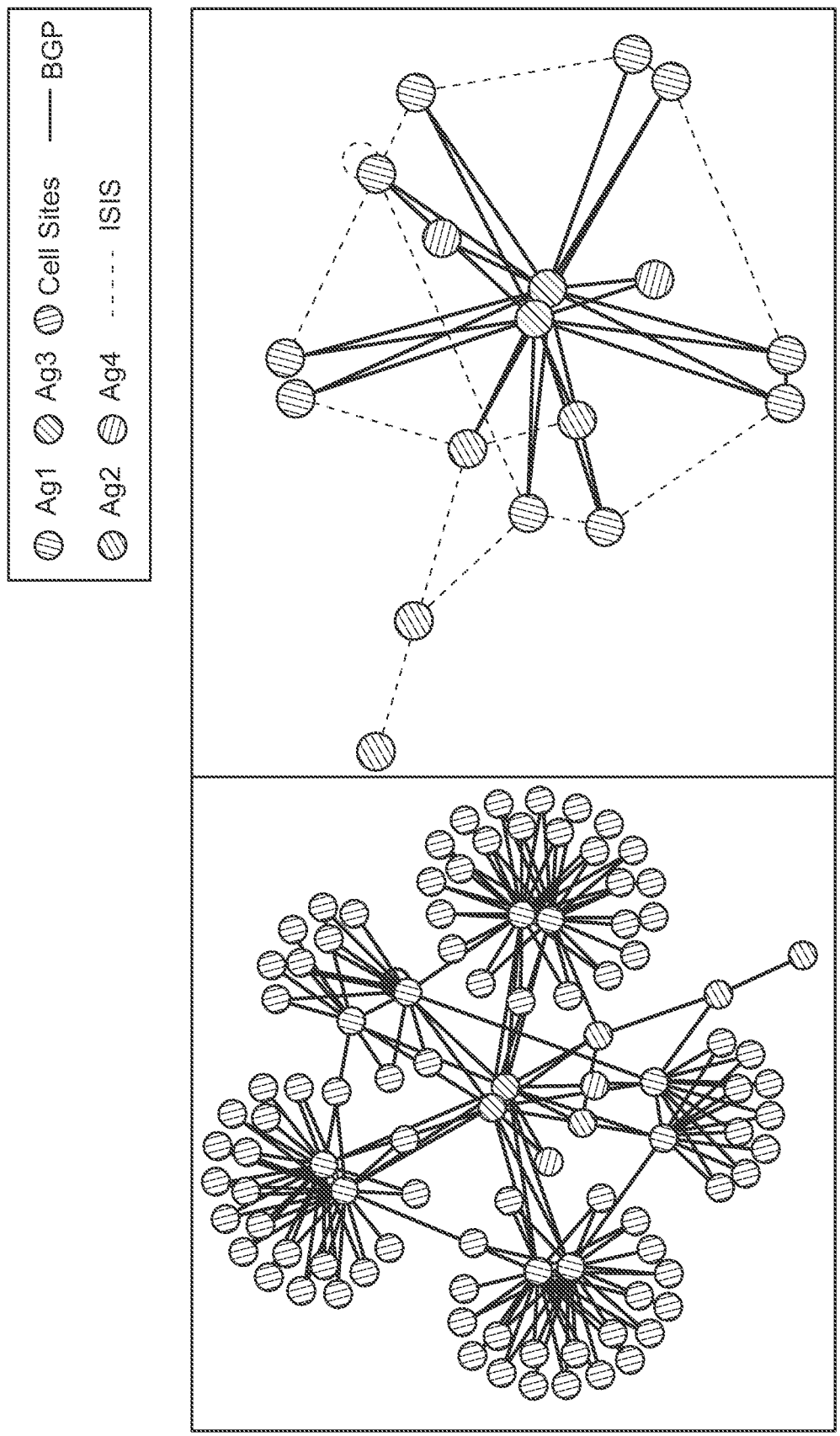
Figure 9B:
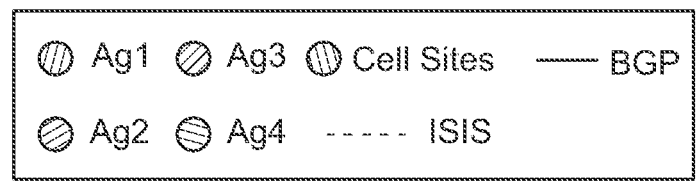
Figure 9B:
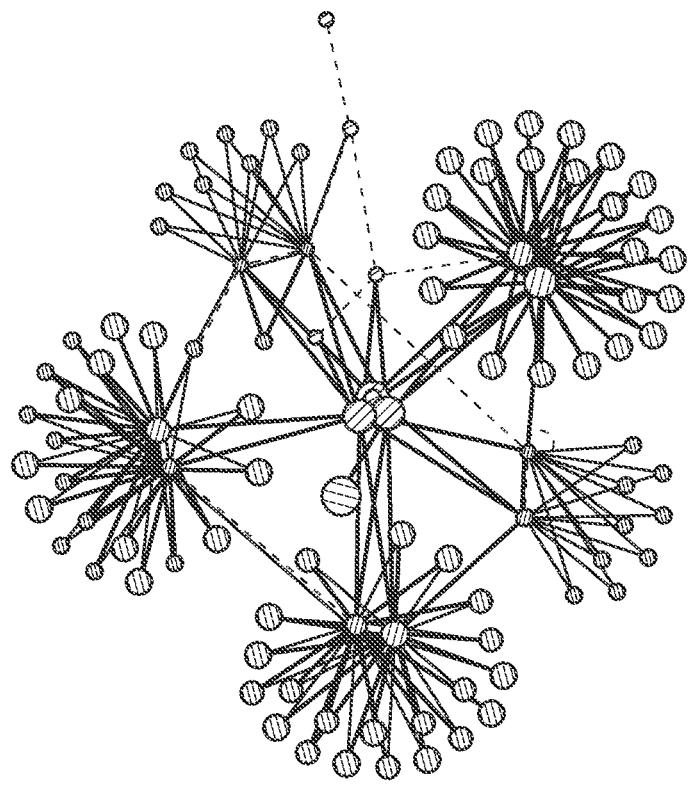

Further, from historical network data, the system and method of the disclosure described herein can predict performance metrics for various traffic scenarios. The system and method of the disclosure described herein can then use a machine-learning algorithm to correlate the performance metrics with node-traffic. Hence, when one or multiple nodes are shut down within the simulation, the system and method of the disclosure described herein can predict and simulate the subsequent changes in the performance metrics for all other active nodes in the network. Thus, the network topology visualization can show the impact of node-outage throughout the network. As an example, as shown in the simulation of FIG. 8B, target Node Y is shown to be shut down, disabled, or powered off within the simulation, and as such, the method and system of the disclosure described herein can re-route all network traffic from the other nodes (such as the periphery nodes and previously connected nodes) to active Node Z. Here, the subsequent impact of Node Y being disabled (e.g., a planned event) can be easily observed from the simulation and visualization of the network. TABLE 2 illustrates the scenario prior to Node Y being disabled, and a scenario after Node Y is disabled, wherein the predicted/estimated performance score of Node Z has been reduced after the shut down of Node Y. Here, it is contemplated within the scope of the disclosure described herein that any of the nodes within the visualization may be also be color coded or include any type of indicia to differentiate each node from other nodes.

between the bandwidth and the total congested traffic at any given node. Further, a very high TCR may signify or represent that the router/node is operating at its maximum limit and be could be prone or susceptible to an error or outage. Further, in one exemplary embodiment, dashed line links/edges can show transport-traffic with an ISIS protocol and straight-line links can show traffic with a BGP protocol. Further, the thickness/width of links between the nodes can represent the traffic congestion of the transmitting router, wherein the router having the thickest link/line also has the highest traffic-congestion value.

Figure 10A:
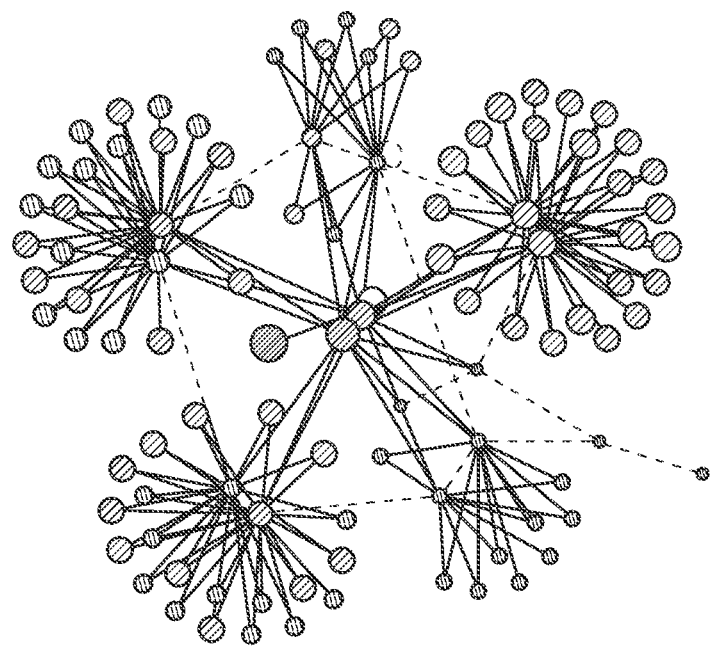
Figure 10B:
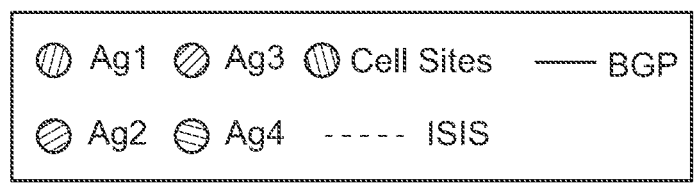
Figure 10B:
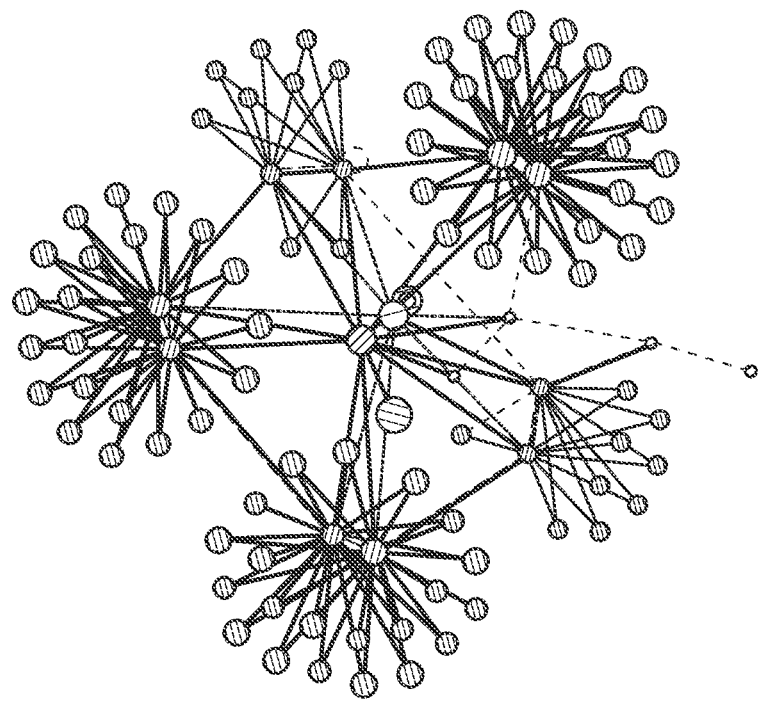

FIGS. 10A-10B can further illustrate a heat map with respect to each node within the network, wherein each node can be color coded (or include a different shade of a color) depending on that nodes TCR. For example, nodes having darker shades of a color can represent nodes having the most TCR and can visually represent or signify or represent to a user that the node may be near maximum capacity bandwidth. In addition, other nodes having another color can represent nodes that are currently in a shut-down or powered off state and certain link/line color can also represent that the link is not in operation.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible techni-

TABLE 2

| | | | Before disabling Node Y | | | | |
| --- | --- | --- | --- | --- | --- | --- | --- |
| Node Power | Node Name | Connected Users | Connected Cell Sites | Bandwidth (Mbps) | Total Throughput | Traffic Congestion Ratio (%) | Performance Score (%) |
| On | Node Y | 200 | 5 | 60 | 27.8 | 48.3 | 70 |
| On | Node Z | 275 | 5 | 60 | 25.2 | 47.2 | 70 |
| | | | After disabling Node Y | | | | |
| Node Power | Node Name | Connected Users | Connected Cell Sites | Bandwidth (Mbps) | Total Throughput | Traffic Congestion Ratio (%) | Predicted Performance Score (%) |
| On | Node Y | 0 | 0 | 0 | 0 | 0 | 0 |
| On | Node Z | 475 | 10 | 60 | 54.2 | 95.3 | 30 |

Referring to FIGS. 9A-10B, certain nodes, such as nodes, switch routers, or aggregation points Ag1, Ag2, Ag3, and Ag4, can be shown connected to various group centers or Cell Sites (and with each other) via a BGP connection which form a ring network topology, as shown in FIGS. 9A-10B. Further, as shown in FIGS. 9A-10B, the thickness and width of links between the nodes can represent the bandwidth of the transmitting node or router. For example, node links having thicker (or wider in width) edges/lines have a higher bandwidth value as compared to node links having thinner edges/lines. In addition, each node can (including its connection links representing traffic) can be color coded. Further, radius or size of each node can also change depending on the TCR of each node. For example, the larger in size the node, the higher the TCR. Here, the TCR can be shown in cal detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of simulating an effect on a network in response to a network-related event, the method comprising:
receiving data with respect to a plurality of nodes within a network;
generating a network graph with respect to each of the nodes within the network;
disabling, in a simulation of the network, at least one first node from the plurality of nodes within the network;
re-routing the network traffic from the at least one first node which is disabled to one or more alternative nodes within the network;
receiving updated data with respect to the plurality of nodes within the network;

calculating a first value based on network traffic with respect to each of the nodes based on the received updated data;
calculating a second value based on performance with respect to each of the nodes based on the received updated data;
updating the network graph by applying the calculated first value and second value; and
identifying, from the updated network graph, one or more nodes from the plurality of nodes that are susceptible to an error or outage within the network.

2. The method of claim 1, further comprising:
sending the updated network graph to a neural network.

3. The method of claim 2, further comprising:
training the neural network based on the updated network graph and one or more associations between the calculated first value and second value for each of the nodes.

4. The method of claim 1, further comprising:
determining if a recalculation of the second value is below a threshold value with respect one or more nodes from the plurality of nodes within the simulation of the network.

5. The method of claim 4, further comprising:
upon determining that the recalculated second value is below the threshold value with respect to the one or more nodes from the plurality of nodes within the network, disabling, based on priority, the one or more nodes from the plurality of nodes within the network based on the disabled first node's impact on the network, wherein the impact is based on at least one of network or node traffic congestion, network or node throughput, network or node bandwidth, network or node packet loss, network or node performance, or network or node downtime.

6. The method of claim 4, further comprising:
upon determining that the recalculated second value is not below the threshold value with respect to the one or more nodes from the plurality of nodes within the network, disabling, simultaneously, the one or more nodes from the plurality of nodes within the network based on the disabled first node's impact on the network, wherein the impact is based on at least one of network or node traffic congestion, network or node throughput, network or node bandwidth, network or node packet loss, network or node performance, or network or node downtime.

7. The method of claim 1, wherein the step of generating the network graph with respect to each of the nodes within the network further comprises:
outputting the network graph as a network ring topology visualization within a graphical user interface, wherein each of the nodes are shown in relation to each other;
receiving a selection with respect to one or more displayed nodes; and
outputting one or more properties associated with the selected one or more nodes within the graphical user interface.

8. The method of claim 7, wherein a link between each of the nodes within the graphical user interface is represented by one or more lines comprised of varying thickness depending on the level network traffic associated with the link or the level of network traffic between two nodes.

9. An apparatus for simulating an effect on a network in response to a network-related event, comprising:
a memory storage storing computer-executable instructions; and
a processor communicatively coupled to the memory storage, wherein the processor is configured to execute the computer-executable instructions and cause the apparatus to:
receive data with respect to a plurality of nodes within a network;
generate a network graph with respect to each of the nodes within the network;
disable, in a simulation of the network, at least one first node from the plurality of nodes within the network;
re-rout the network traffic from the at least one first node which is disabled to one or more alternative nodes within the network;
receive updated data with respect to the plurality of nodes within the network;
calculate a first value based on network traffic with respect to each of the nodes based on the received updated data;
calculate a second value based on performance with respect to each of the nodes based on the received updated data;
update the network graph by applying the calculated first value and second value; and
identify, from the updated network graph, one or more nodes from the plurality of nodes that are susceptible to an error or outage within the network.

10. The apparatus of claim 9, wherein the computer-executable instructions, when executed by the processor, further cause the apparatus to:
send the updated network graph to a neural network.

11. The apparatus of claim 10, wherein the computer-executable instructions, when executed by the processor, further cause the apparatus to:
train the neural network based on the updated network graph and one or more associations between the calculated first value and second value for each of the nodes.

12. The apparatus of claim 9, wherein the computer-executable instructions, when executed by the processor, further cause the apparatus to:
determine if a recalculation of the second value is below a threshold value with respect one or more nodes from the plurality of nodes within the simulation of the network.

13. The apparatus of claim 12, wherein the computer-executable instructions, when executed by the processor, further cause the apparatus to:
upon determining that the recalculated second value is below the threshold value with respect to the one or more nodes from the plurality of nodes within the network, disable the one or more nodes, based on priority, from the plurality of nodes within the network based on the disabled first node's impact on the network, wherein the impact is based on at least one of network or node traffic congestion, network or node throughput, network or node bandwidth, network or node packet loss, network or node performance, or network or node downtime.

14. The apparatus of claim 12, wherein the computer-executable instructions, when executed by the processor, further cause the apparatus to:
upon determining that the recalculated second value is not below the threshold value with respect to the one or more nodes from the plurality of nodes within the network, disable, simultaneously, the one or more nodes from the plurality of nodes within the network based on the disabled first node's impact on the network, wherein the impact is based on at least one of network or node traffic congestion, network or node throughput, network or node bandwidth, network or node packet loss, network or node performance, or network or node downtime.

15. The apparatus of claim 12, wherein the computer-executable instructions, when executed by the processor, further cause the apparatus to:

output the network graph as a network ring topology visualization within a graphical user interface, wherein each of the nodes are shown in relation to each other;

receive a selection with respect to one or more displayed nodes; and output one or more properties associated with the selected one or more nodes within the graphical user interface.

16. A non-transitory computer-readable medium comprising computer-executable instructions for simulating an effect on a network in response to a network-related event by an apparatus, wherein the computer-executable instructions, when executed by at least one processor of the apparatus, cause the apparatus to:

receive data with respect to a plurality of nodes within a network;

generate a network graph with respect to each of the nodes within the network;

disable, in a simulation of the network, at least one first node from the plurality of nodes within the network;

re-rout the network traffic from the at least one first node which is disabled to one or more alternative nodes within the network;

receive updated data with respect to the plurality of nodes within the network;

calculate a first value based on network traffic with respect to each of the nodes based on the received updated data;

calculate a second value based on performance with respect to each of the nodes based on the received updated data;

update the network graph by applying the calculated first value and second value; and identify, from the updated network graph, one or more nodes from the plurality of nodes that are susceptible to an error or outage within the network.

* * * * *